United States Patent [19]
McNaughton et al.

[11] Patent Number: 5,273,254
[45] Date of Patent: Dec. 28, 1993

[54] FLUID CONDUIT QUICK CONNECTORS WITH ANTI-SPILL VALVES

[75] Inventors: James McNaughton, Rochester; Donald C. Walker, Pontiac, both of Mich.

[73] Assignee: Huron Products Industries, Inc., Mt. Clemens, Mich.

[21] Appl. No.: 918,986

[22] Filed: Jul. 23, 1992

[51] Int. Cl.⁵ ............................................. F16L 37/28
[52] U.S. Cl. .................................. 251/149.6; 251/356
[58] Field of Search ............... 251/149.1, 149.3, 149.6, 251/356; 137/535, 540, 541, 543, 543.15

[56] References Cited

U.S. PATENT DOCUMENTS 4,436,125  3/1984  Blenkush ................. 251/149.6 X
4,819,908  4/1989  Norkey .................... 251/149.6

Primary Examiner—Martin P. Schwadron
Assistant Examiner—Kevin L. Lee
Attorney, Agent, or Firm—Kinzer, Plyer, Dorn, McEachran & Jambor

[57] ABSTRACT

A fluid connection includes a valve which blocks flow into or out of the housing until a tube is fully received within the housing. The valve preferably has structure which is biased against the valve seat in the housing until the tube is moved into the housing. The valve seat is preferably in a plane which is perpendicular to the central axis of the housing. Further, the valve preferably has surfaces which guide fluid between the radially outer surface of the valve and the interior of the tube. In one embodiment, the valve includes a forward ring which contacts a tube and which has two ribs connected to the main valve body. The valve surface is preferably a conical surface spaced axially inwardly from the forward ring. Preferably, additional conical surfaces are disposed between the ribs and guide the fluid between the valve surface and the interior of the tube. In another embodiment, the valve may have an X or Y-shaped cross-sectional ribs which contact the tube. The ribs may be conical and extend axially into the tube to guide fluid flow. Further, the valve surface preferably has a cross-sectional shape which roughly corresponds to the shape of the ribs, and the valve seat opening has a similar cross-sectional shape with a cross-sectional area intermediate that of the valve surfaces and the ribs.

7 Claims, 4 Drawing Sheets

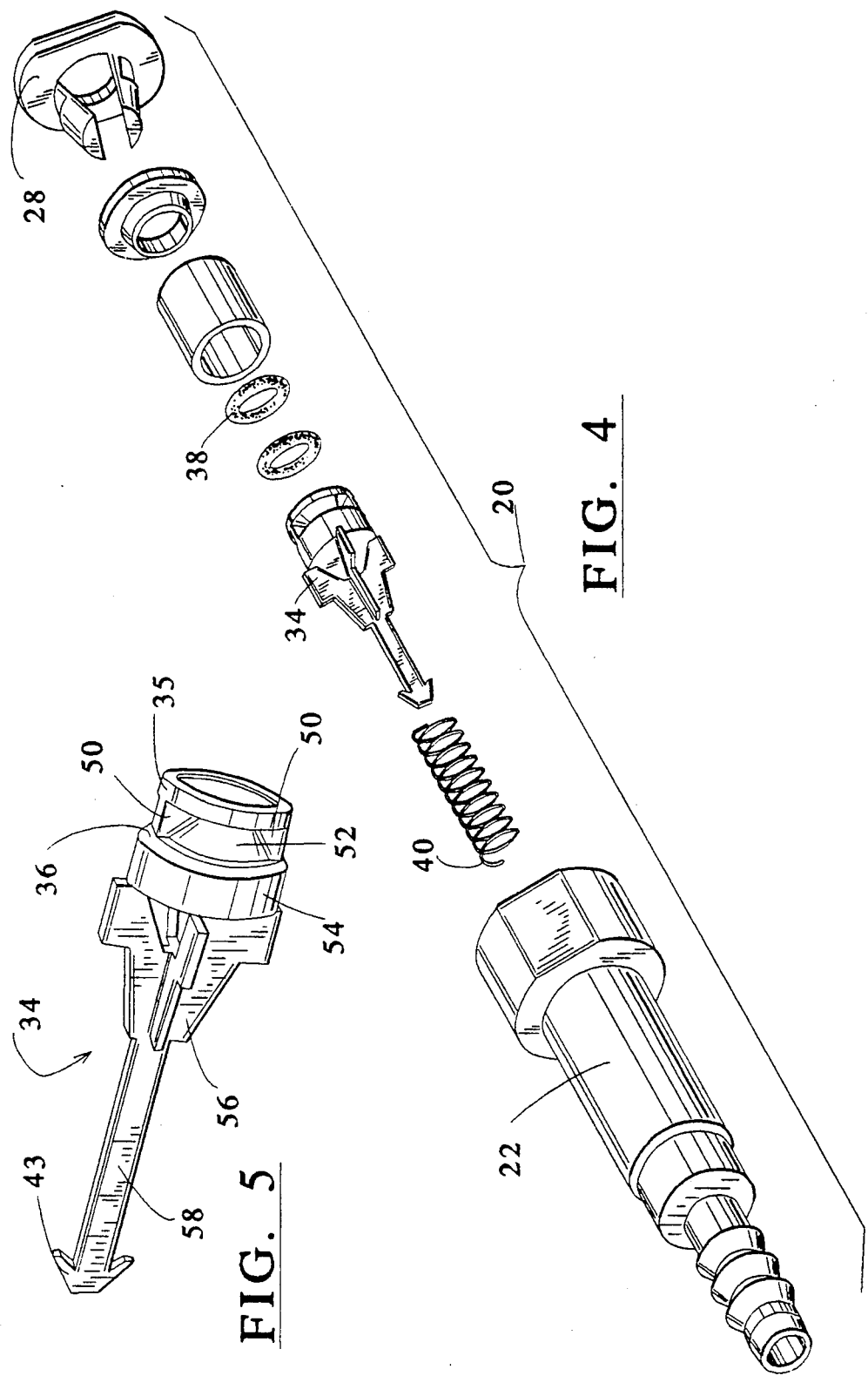

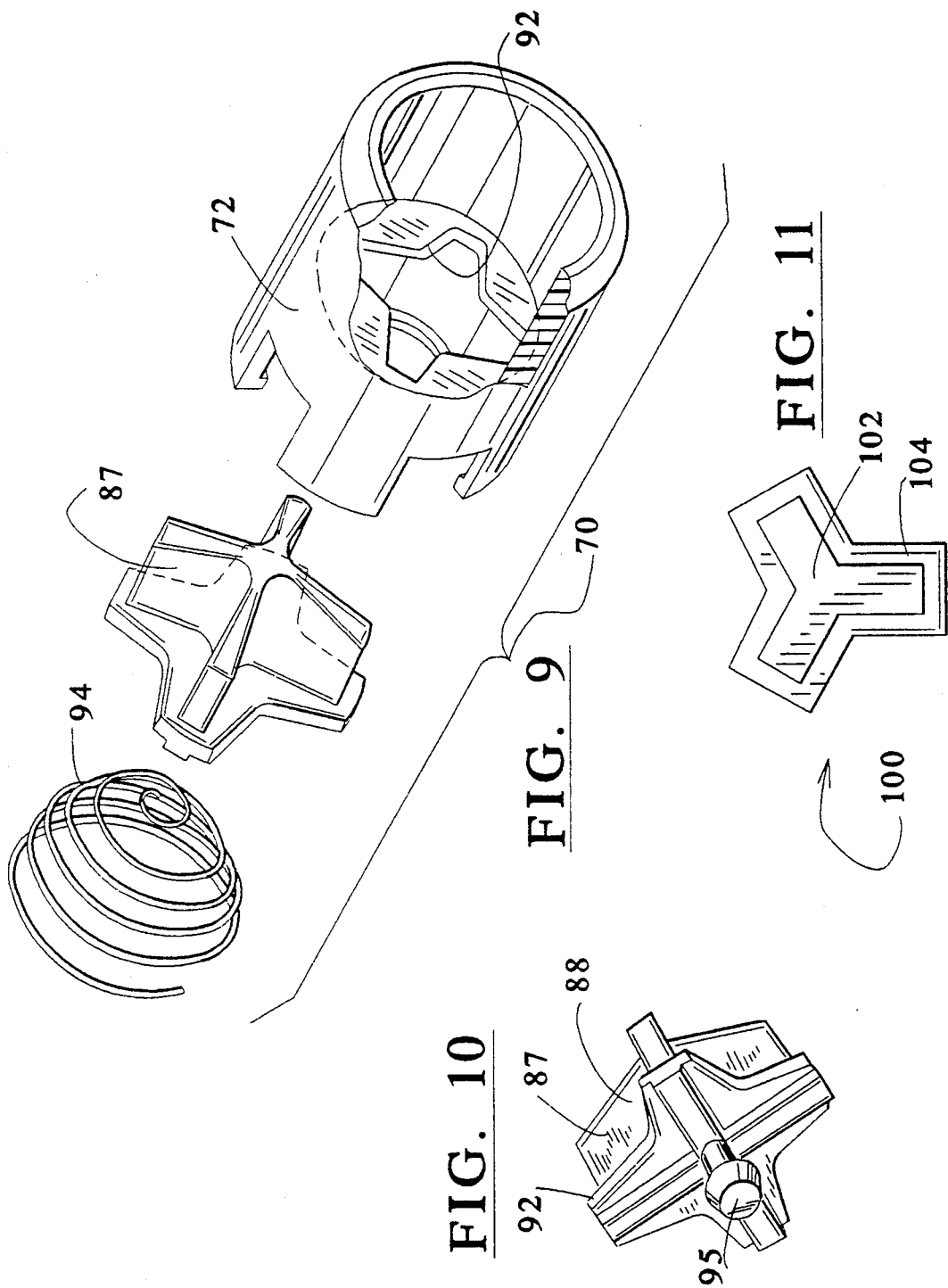

FLUID CONDUIT QUICK CONNECTORS WITH ANTI-SPILL VALVES

BACKGROUND OF THE INVENTION

This application in general relates to improvements in valves received within fluid housings to prevent spilling when a tube is not properly connected to the housing.

In the prior art, various valves are known which prevent flow between a first fluid line and a second fluid line when the two are not properly connected. Such valves are particularly valuable when utilizing fluid quick connectors. In fluid quick connectors, a tube may be quickly attached to a fluid housing to provide a fluid connection.

The prior art has developed valves which are seated against a valve seat when the tube is not received within the housing, and which are contacted by the tube, and moved away from the valve seat to allow flow between the first and second lines when the tube is properly received within the housing. In general, these valves have provided undesirable restrictions to fluid flow and have disrupted the flow. Thus, these valves have not been practically incorporated within production fluid connections.

SUMMARY OF THE INVENTION

The present invention discloses valves which minimize restriction and disruption of fluid flow between a tube and a housing.

In disclosed embodiments of the present invention, a valve is biased toward a first position within a fluid housing. At the first position, a valve seat is provided in a plane generally perpendicular to a central axis of the housing. When a tube is fully received within the housing, the valve is moved away from this first position towards a second position where the valve is no longer seated. Structure on the valve guides the fluid between the outer periphery of the valve and a central forward position of the valve to communicate with the interior of the tube, which is now received in the housing. This minimizes restrictions and disruptions in the fluid flow.

In one preferred embodiment of the present invention a forward ring contacts the tube end, and is connected to the valve body by ribs. These ribs provide structural integrity to the valve. In this embodiment, the valve structure includes a conical flange at the outer peripheral surface of the valve body which contacts a seal in the housing. The seal defines a valve seat. The valve body preferably consists of conically outwardly extending surfaces which guide the fluid between the outer periphery of the valve body and flow passages which extend inwardly of the fluid ring into or from the interior of the tube. The guidance of the flow minimizes disruptions in the flow, and restrictions to flow.

In other preferred embodiments of the present invention, a plurality of ribs are the valve portion which actually contacts the tube end. In disclosed embodiments, three and four ribs are formed into either Y or X shapes. Less than three ribs could be used, and more than four ribs could also be used. The ribs generally conform in configuration to a similar shaped valve surface spaced axially inwardly from the ribs. Preferably the housing includes a plate which has valve seat opening roughly corresponding to the shape of the ribs and valve surface, but of smaller area than the valve surface. A spring forces the valve surface against the valve seat opening to prevent flow when a tube is not properly received within the housing. When a tube is inserted into the housing, the tube end contacts the ribs and forces the valve against the force of the spring, moving the valve surfaces off of the valve seat opening. Thus, flow can communicate between the tube inner end and the second line by moving between the ribs, through the valve opening in the housing, and past the valve surfaces. Since the valve surfaces are not annular, they do not present an undue restriction to flow. The structure of the ribs, valve surfaces and valve seat guide the flow between the outer periphery of the valve and the interior of the tube.

These and other features of the present invention can be best understood from the following specification and drawings, of which the following is a brief description.

BRIEF DESCRIPTION OF THE DRAWINGS

FIG. 4 is an exploded view of the first embodiment.

FIG. 5 is a perspective view of a valve element according to the first embodiment.

FIG. 9 is an exploded view of the second embodiment fluid connection.

FIG. 10 is a perspective view of the second embodiment valve.

FIG. 11 is an end view of a third embodiment valve.

DETAILED DESCRIPTION OF A PREFERRED EMBODIMENT

Figure 1:
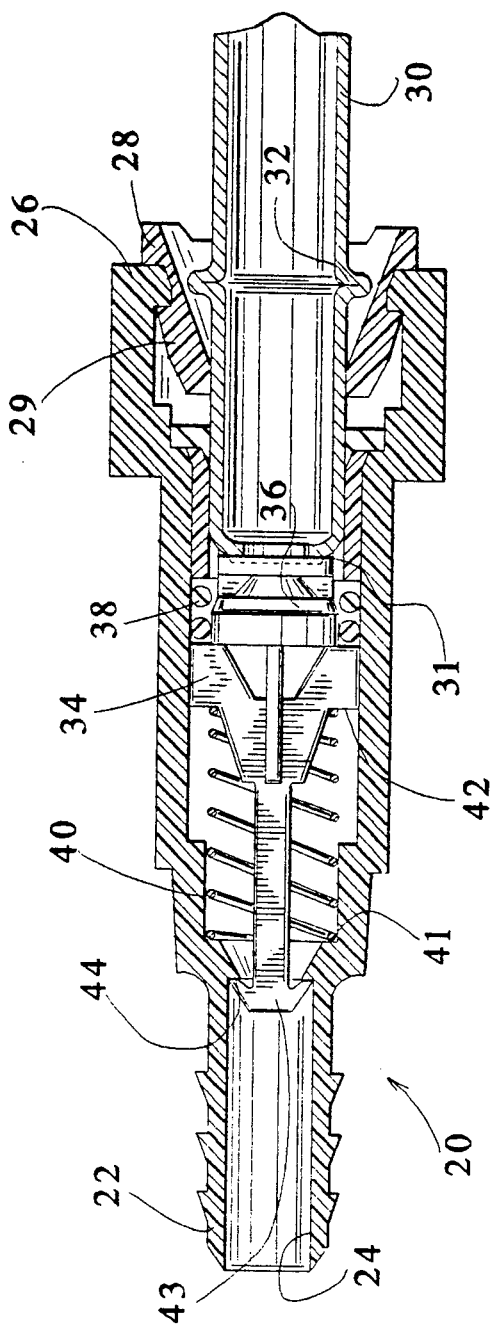
FIG. 1 is a cross-sectional view through an assembled fluid connection including the first embodiment of the present invention.

A fluid connection 20 includes a housing 22 having an inner end 24 and an outer end 26. A retainer 28 includes resilient legs 29 which selectively retain a tube 30 within housing 22. To this end, tube 30 is formed with a radially greater, or upset portion 32, which selectively biases legs 29 radially outwardly to allow passage of upset portion 32. Such retainer structure is well known in the art.

A valve 34 has a conical valve surfaces 36 at an inner periphery which contacts a seal 38 to block flow between ends 24 and 26 of housing 22 when tube 30 is not fully inserted, as in the illustrated position.

A spring 40 abuts a face 41 of housing 22 and forces valve 34 towards outer end 26 such that valve surface 36 is forced into seal 38. Thus, a seal is formed between valve surface 36 and seal 38 in a plane which is generally perpendicular to the axis of housing 22. Spring 40 abuts a surface 42 on valve 34. A stop tab 43 abuts a face 44 in housing 22 preventing undue outward movement of valve 34.

When tube 30 is not fully inserted within housing 22, surface 36 abuts seal 38, and flow between ends 24 and 26 will not occur. Thus, should end 24 be connected to a second fluid line, which contains fluid, fluid will not leak outwardly of end 26.

Figure 2:
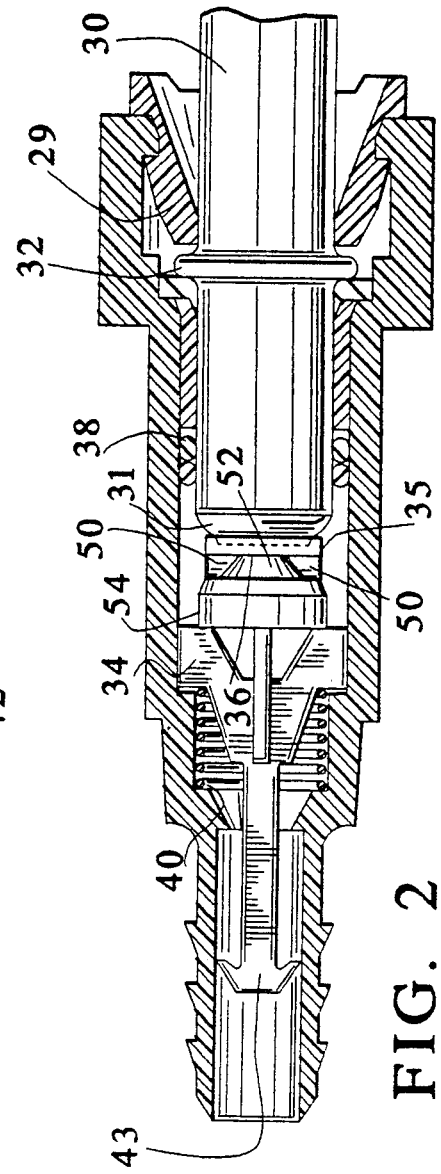
FIG. 2 is a view similar to FIG. 1, but showing the fully assembled connection.

As shown in FIG. 2, tube 30 has now been fully inserted, with upset portion 32 being received inwardly of legs 29. Inner end 31 of tube 30 has abutted an axially outer ring 35 of valve 34, and forces valve 34 to compress spring 44 and move axially inwardly. Surface 36 no longer contacts seal 38.

As shown, a pair of ribs 50 connect forward ring 35 to the remainder of valve body 34. Conical surfaces 52 are formed between ribs 50 to guide fluid between the outer peripheral surface 54 of valve 34 and the interior of ring 35 where fluid communicates with tube 30. The conical structure ensures that fluid will flow smoothly between ends 24 and 26 into tube 30, once valve 34 has been unseated by tube inner end 31.

This is a great improvement over the prior art, which did not successfully guide the flow in similar valves. Due to this guidance the valve will not create an undue restriction or disruptions to flow between ends 24 and 26.

Figure 3:
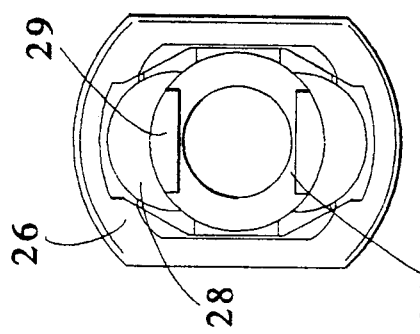
FIG. 3 is an end view of the housing of the first embodiment illustrated in FIG. 1.

FIG. 3 is a view looking inwardly from outer end 26 of housing 22. As shown, retainer 28 has legs 29 extending inwardly with forward ring 35 having an inner peripheral diameter approximately equal to the inner peripheral diameter of legs 29. This inner peripheral diameter of leg 29 is approximately equal to the outer peripheral diameter of the bulk of tube 30, with the exception of upset portion 32 and the tapered inner end 31. Forward ring 35 has a slightly smaller inner peripheral surface, to contact inner end 31 and tube 30. As shown, inner end 31 is tapered and extends into forward ring 35, providing a tight fluid seal.

As shown in FIG. 4, the assembled connection 20 includes housing 22, spring 40, valve 34, seal 38 and retainer 28.

As shown in FIG. 5, valve 34 includes forward ring 35 connected by a pair of ribs 50 to a main valve body. Valve surface 36 is generally conical. The seal between valve surface 36 and seal 38 will tend to be at a circular surface lying in a plane generally perpendicular to the axis of housing 22. Conical surfaces 52 extend radially outwardly to guide fluid between outer peripheral surface 54 and flow passages interiorly of forward ring 35. In the absence of conical surfaces 52, disruptions and excessive turbulence in the fluid flow might occur. Ribs 56 are spaced axially rearwardly of the outer peripheral surface 54, and a tab line 58 is connected to stop tab 43.

Figure 6:
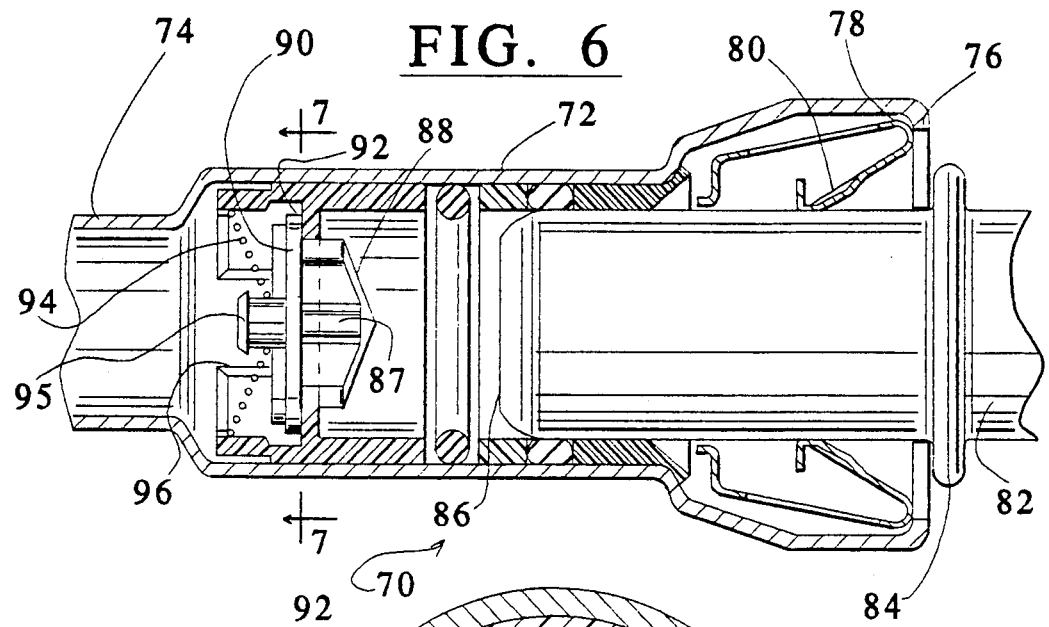
FIG. 6 is a cross-sectional view through a second embodiment fluid connection.

A second embodiment connection 70 is illustrated in FIG. 6. A housing 72 has an inner end 76 and an outer end 78. A retainer 78 includes legs 80 which selectively retain a tube 82 in housing 72. Tube 82 has an upset portion 84 and an axially inner end 86. A valve 87 includes a number of ribs 88 and a valve surface 90 which is forced against a valve seat opening 92 to block flow between ends 74 and 76. The valve contact is in a plane which is perpendicular to a central axis of the housing. Spring 94 forces valve 87 into valve seal opening 92. A pin 95 on valve 87 moves within a guide surface 96 to guide valve 87 within housing 72. When tube 82 is not fully inserted, valve 87 is in the illustrated position blocking flow between ends 74 and 76.

Figure 7:
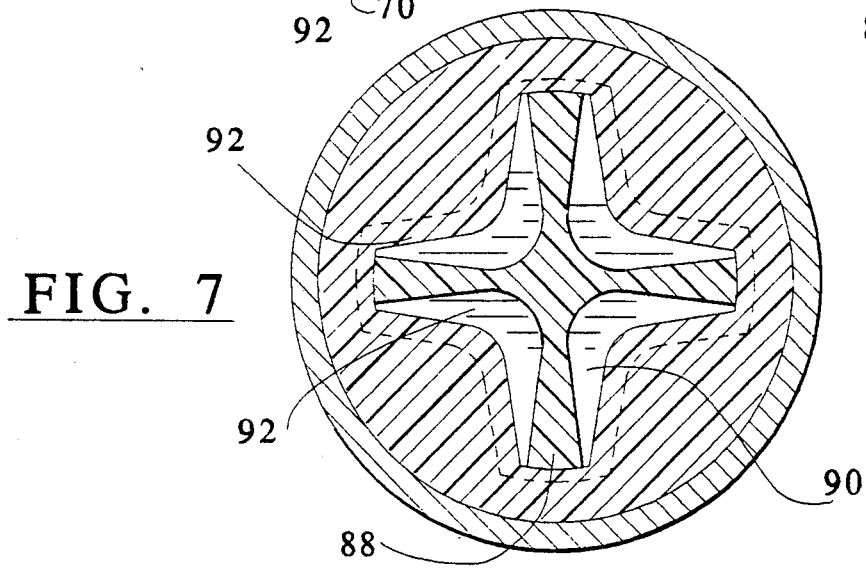
FIG. 7 is a cross-sectional view along line 7-7 as shown in FIG. 6.

As shown in FIG. 7, there are four ribs 88 on valve 87 arranged in an X or cross-shape. Tube axially inner end 86 contacts these ribs once it has moved axially inwardly to a sufficient extent.

Valve surfaces 90 and valve seat opening 92 also have a generally X or cross-shape similar to ribs 88. As shown, valve surfaces 90 have a greater cross-sectional area than valve seat opening 92, such that valve 87 blocks flow through valve seat 92 when it is forced against valve seat opening 92. Ribs 88 have a smaller cross-sectional area than valve seat opening 92.

Figure 8:
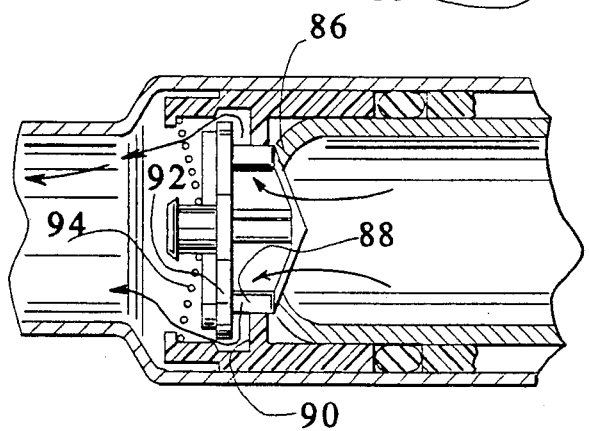
FIG. 8 is an enlarged view of a portion of the connector shown in FIG. 6, with the tube fully assembled.

As shown in FIG. 8, when tube 82 is fully connected, valve 87 is forced axially inwardly and away from valve seat opening 92. Fluid may then flow between end 74 and end 76. The fluid flows axially outwardly around valve surfaces 90, through valve seat opening 92, and between ribs 88 into or out of axially inner end 86 of tube 82. Due to the similar shapes of the ribs, the valve seat opening, and the valve surfaces, the fluid is smoothly guided, and thus the valve 87 does not present an undue restriction to flow, or cause undue disruption to the flow.

In the prior art, similar valves may have used annular valve surfaces forced against the valve seat. The annular surfaces caused all of the fluid to necessarily flow radially outwardly around the annular surface, and then through the valve opening, which is generally slightly radially inwardly from the annular surfaces. The inventive valve use of a plurality of circumferentially-spaced valve surface portions allow the fluid flow to be generally axial, thus minimizing disruptions in the flow. The flow must move slightly around the valve surfaces 90, going into or out of the valve seat openings 92. There is no undue restriction of the flow, and further, the ribs 88 and valve surfaces 90 tend to guide the flow into and out of the valve seat opening 92, minimizing disruptions to the flow.

As further shown, ribs 88 have a conical forward facing end which extends into inner end 86 of tube 82. This further assists in smoothly guiding the flow into, or out of, tube 82.

As shown in FIG. 9, connection 70 consists of spring 94, valve 87, and housing 72 which includes valve seat opening 92.

As shown in FIG. 10, pin 95 is formed on a rear face of valve 87. Valve surfaces 90 have a similar cross-section to ribs 88, although they are of a larger cross-sectional area.

As shown in FIG. 11, a third embodiment valve 100 is similar to valve 87, but has only three ribs 102 arranged in a general Y-shape, and a similarly shaped valve surface 104. Of course, the valve seat opening used would have a similar configuration.

Although four and three rib valve embodiments have been disclosed, it should be understood that any number of ribs can be utilized.

Preferred embodiments of the present invention have been disclosed, however, a worker of ordinary skill in the art would recognize that certain modifications would come within the scope of this invention. For that reason the following claims should be studied in order to determine the true scope and content of this invention.

We claim:

1. A fluid connection comprising:
    a housing extending between a first and second end, a central axis of said housing being defined extending from said first end inwardly toward said second end;
    a valve selectively movable within said valve housing from a first position where a valve surface on said valve is seated against a valve seat in said housing and blocks flow between said first and second ends, a spring biasing said valve toward said first position, and said valve being movable inwardly of said housing against the force of said spring to a position where it is not seated and the first and second ends are fluidly connected;

a tube selectively received within said housing, said tube having an inner end which is in a position when fully connected within said housing where it contacts a surface of said valve and moves said valve axially inwardly from said first position such that said first and second ends of said housing are fluidly connected;

said valve surface contacting said valve seat along a plane generally perpendicular to said central axis, and said valve having guide surfaces to guide the fluid flow between said first and second ends;

a plurality of ribs positioned axially outwardly of said valve surface, said ribs forming a portion of said guide surfaces; and a ring connected to two of said ribs at an axially outer end of said valve, said ring being said contact surface and contacting said axial inner end of said tube when said tube is fully inserted.

2. A fluid connector as recited in claim 1 wherein said guide surfaces further include conically outwardly extending surfaces formed between said ribs which guide flow between an outer peripheral surface of said valve and said interior of said tube.

3. A fluid connector as recited in claim 1 wherein there are four of said ribs.

4. A fluid connection comprising:

a housing extending between a first and second end, a central axis of said housing being defined extending from said first end inwardly toward said second end;

a valve selectively movable within said valve housing from a first position where a valve surface on said valve is seated against a valve seat in said housing and blocks flow between said first and second ends of said housing, a spring biasing said valve toward said first position, and said valve being movable inwardly of said housing against the force of said spring to a position where it is not seated and the first and second ends are fluidly connected;

a tube selectively received within said housing, said tube having an inner end defining a flow opening, said inner end being in a position when fully connected within said housing where it contacts a contact surface of said valve and moves said valve axially inwardly from said first position such that said first and second ends of said housing are fluidly connected, said contact surface being a ring provided at an axially outer end of said valve, said ring contacting said axial inner end of said tube when said tube is fully inserted; and said valve including conically outwardly extending surfaces formed between said contact surface and said valve surface, said conically outwardly extending surfaces guiding fluid between an outer peripheral surface of said valve and an interior of said tube.

5. A fluid connection as recited in claim 4 wherein a pair of ribs connect said ring to a valve body, and said conically outwardly extending surfaces extend circumferentially between said ribs.

6. A fluid connection as recited in claim 4 wherein said valve surface is a conical surface positioned axially inwardly from said conically outwardly extending surfaces.

7. A fluid connection as recited in claim 6 wherein said valve seat is provided at an o-ring received within said housing, said conical surface selectively contacting said o-ring to provide a seal.

* * * * *